(12) United States Patent  
Grice

(10) Patent No.: US 11,564,356 B2  
(45) Date of Patent: Jan. 31, 2023

(54) TREE BRANCH AND BRUSH CUTTING ATTACHMENT

(71) Applicant: Johnny E. Grice, Daleville, AL (US)

(72) Inventor: Johnny E. Grice, Daleville, AL (US)

( * ) Notice: Subject to any disclaimer, the term of this patent is extended or adjusted under 35 U.S.C. 154(b) by 0 days.

(21) Appl. No.: 16/360,688

(22) Filed: Mar. 21, 2019

(65) Prior Publication Data

US 2019/0289789 A1 Sep. 26, 2019

Related U.S. Application Data

(60) Provisional application No. 62/646,163, filed on Mar. 21, 2018.

(51) Int. Cl.
| | | |
|---|---|---|
| *A01G 3/08* | (2006.01) | |
| *A01D 34/86* | (2006.01) | |
| *A01D 34/64* | (2006.01) | |

(52) U.S. Cl.  
CPC .............. *A01G 3/085* (2013.01); *A01D 34/64* (2013.01); *A01D 34/866* (2013.01)

(58) Field of Classification Search  
CPC ........ A01D 3/085; A01D 75/28; A01D 34/86; A01D 34/866; A01D 34/80; A01D 34/84; A01D 34/662; A01G 3/00–088; A01G 23/095  
See application file for complete search history.

(56) References Cited

U.S. PATENT DOCUMENTS

| | | | | | |
|---|---|---|---|---|---|
| 1,604,623 | A | * | 10/1926 | Whidden | B62D 49/065 172/677 |
| 2,976,663 | A | * | 3/1961 | Smith | A01D 34/84 56/10.7 |
| 3,063,225 | A | * | 11/1962 | Barrentine | A01D 34/866 56/11.6 |
| 3,087,296 | A | * | 4/1963 | Cowles | A01D 34/86 56/10.7 |
| 3,096,896 | A | * | 7/1963 | Norton | B66F 9/147 414/670 |
| 3,274,762 | A | * | 9/1966 | Timmons | A01D 34/866 56/15.2 |
| 3,319,407 | A | * | 5/1967 | Jordan | A01D 34/866 56/10.7 |
| 3,483,683 | A | * | 12/1969 | McCanse | A01D 34/866 56/10.7 |
| 3,553,946 | A | * | 1/1971 | Taylor et al. | A01D 34/86 56/10.7 |
| 3,729,910 | A | * | 5/1973 | Hardee | A01D 34/246 56/11.9 |

(Continued)

FOREIGN PATENT DOCUMENTS

| | | | | | |
|---|---|---|---|---|---|
| EP | | 2283719 | A2 * | 2/2011 | .......... A01B 59/066 |
| FR | | 2413029 | A1 * | 7/1979 | .......... A01D 34/866 |

*Primary Examiner* — Thomas B Will  
*Assistant Examiner* — Joan D Misa  
(74) *Attorney, Agent, or Firm* — Dunlap Bennett & Ludwig, PLLC; Anna L. Kinney

(57) ABSTRACT

A cutting attachment includes a mounting bracket and a cutting deck. The mounting bracket is configured to couple to at least one hydraulic arm of a tractor or excavator. The cutting deck is coupled to the mounting bracket. The cutting deck includes an inner surface, an outer surface, a motor coupled to the inner surface, a blade carrier coupled to the outer surface and rotatable by the motor, and at least one blade coupled to the blade carrier.

10 Claims, 4 Drawing Sheets

(56) References Cited

U.S. PATENT DOCUMENTS

| | | | | |
|---|---|---|---|---|
| 3,993,206 A | * | 11/1976 | Jomen | E02F 3/386 414/695 |
| 4,048,789 A | * | 9/1977 | Cartner | A01D 34/246 56/11.9 |
| 4,066,374 A | * | 1/1978 | King | E02D 3/032 172/477 |
| 4,183,195 A | * | 1/1980 | James | A01D 34/246 56/10.4 |
| 4,206,580 A | * | 6/1980 | Truax | A01D 34/866 56/10.4 |
| 4,426,829 A | * | 1/1984 | Johnson | A01D 34/866 56/10.4 |
| 4,432,192 A | * | 2/1984 | Maier | A01D 75/185 56/15.3 |
| 4,445,312 A | * | 5/1984 | Cartner | A01D 34/86 56/15.5 |
| 4,457,127 A | * | 7/1984 | Maier | A01D 34/661 56/192 |
| 4,502,269 A | * | 3/1985 | Cartner | A01D 34/866 56/10.7 |
| 4,518,043 A | * | 5/1985 | Anderson | A01B 63/106 172/38 |
| 4,697,404 A | * | 10/1987 | Brockmeier | A01D 75/30 172/308 |
| 4,876,846 A | * | 10/1989 | Torras | A01D 34/86 56/11.9 |
| 4,878,713 A | * | 11/1989 | Zanetis | E01C 23/088 299/39.5 |
| 4,901,508 A | * | 2/1990 | Whatley | A01D 34/863 56/10.4 |
| 4,912,916 A | * | 4/1990 | Parsons, Jr. | A01D 34/866 56/15.2 |
| 5,005,344 A | * | 4/1991 | McCracken | A01D 34/63 56/14.7 |
| 5,050,372 A | * | 9/1991 | Heiskell | A01B 33/06 56/12.7 |
| 5,419,104 A | * | 5/1995 | Higdon | A01D 34/866 56/10.1 |
| 5,435,117 A | * | 7/1995 | Eggena | A01D 34/27 56/10.2 D |
| 5,526,590 A | * | 6/1996 | Palm | E02D 3/026 172/40 |
| 5,626,007 A | * | 5/1997 | Harrington | A01D 34/66 56/13.5 |
| 5,666,794 A | * | 9/1997 | Vought | A01D 41/16 56/15.2 |
| 5,701,693 A | * | 12/1997 | Brocious | E01H 1/003 172/305 |
| 5,704,201 A | * | 1/1998 | Van Vleet | A01B 33/16 56/14.9 |
| 5,941,056 A | * | 8/1999 | Lehman | A01D 34/661 56/11.6 |
| 6,343,461 B1 | * | 2/2002 | Knott | A01D 43/16 56/11.6 |
| 6,622,466 B1 | * | 9/2003 | Ethier | A01B 33/02 172/24 |
| 6,640,528 B1 | * | 11/2003 | Rowland | A01D 34/866 56/15.2 |
| 6,662,835 B1 | * | 12/2003 | Gengler | A01G 23/091 144/24.12 |
| 6,684,614 B2 | * | 2/2004 | Greenwell | A01D 34/4161 56/10.7 |
| 7,287,364 B2 | * | 10/2007 | Wright | A01D 34/863 56/10.4 |
| 7,418,985 B2 | * | 9/2008 | Torgersen | A01G 3/08 144/4.1 |
| 9,095,092 B2 | * | 8/2015 | Sieben | A01D 42/00 |
| 9,554,514 B2 | * | 1/2017 | Marotte | A01D 34/661 |
| 9,560,801 B2 | * | 2/2017 | Boyle | A01D 34/863 |
| 9,756,784 B2 | * | 9/2017 | Boyle | A01D 34/84 |
| 9,826,680 B2 | * | 11/2017 | Dixon | A01D 34/86 |
| 9,930,832 B2 | * | 4/2018 | Jespersen | A01D 43/003 |
| 10,070,573 B2 | * | 9/2018 | Nielsen | A01D 34/74 |
| 10,470,364 B1 | * | 11/2019 | Odom | A01D 34/64 |
| 2005/0050873 A1 | | 3/2005 | Rookes | A01D 34/84 56/14.7 |
| 2006/0288681 A1 | * | 12/2006 | Kuzub | A01D 34/86 56/14.9 |
| 2014/0026528 A1 | * | 1/2014 | Thiboutot | A01D 34/03 56/10.7 |
| 2014/0260149 A1 | * | 9/2014 | Marotte | A01D 67/005 56/10.6 |
| 2018/0338421 A1 | * | 11/2018 | Christian | E02F 3/3663 |

* cited by examiner

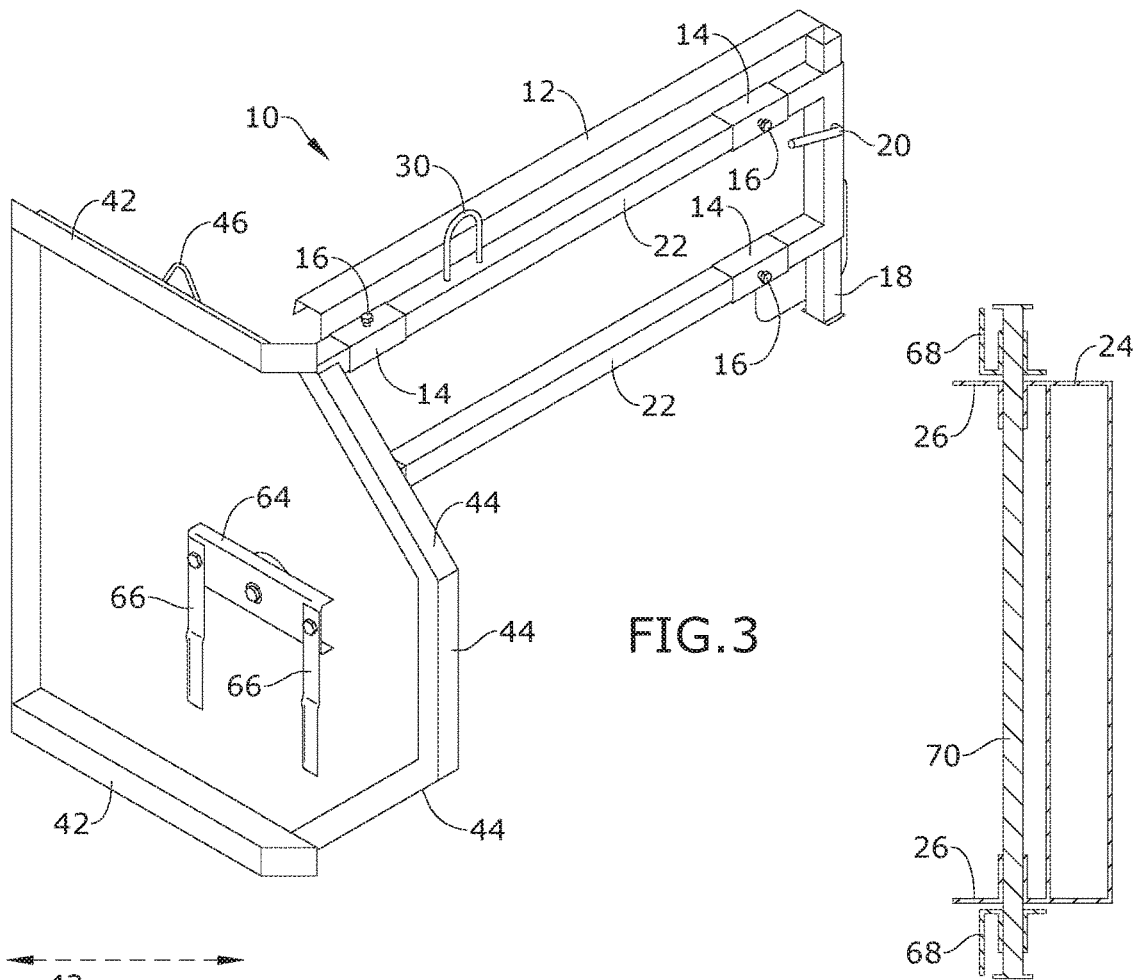

TREE BRANCH AND BRUSH CUTTING ATTACHMENT

CROSS-REFERENCE TO RELATED APPLICATION

This application claims the benefit of priority of U.S. provisional application No. 62/646,163, filed Mar. 21, 2018, the contents of which are herein incorporated by reference.

BACKGROUND OF THE INVENTION

The present invention relates to cutting tree branches and brush and, more particularly, to a tree branch and brush cutter that attaches to a tractor or excavator.

Cutting tree branches and brush high above one's head level and on inclines can be difficult. Currently, the primary method of cutting high branches and brush is to use a chainsaw coupled to an end of a long pole. Using this method, users can only cut one limb at a time, which makes the process time consuming and requires added physical effort. Additionally, chainsaws coupled to long poles are difficult to control.

As can be seen, there is a need for a tree branch and brush cutter that attaches to a tractor or excavator.

SUMMARY OF THE INVENTION

In one aspect of the present invention, a cutting attachment comprises: a mounting bracket configured to couple to at least one hydraulic arm of a tractor or excavator; and a cutting deck coupled to the mounting bracket, wherein the cutting deck comprises an inner surface, an outer surface, a motor, a blade carrier coupled to the outer surface and rotatable by the motor, and at least one blade coupled to the blade carrier.

These and other features, aspects and advantages of the present invention will become better understood with reference to the following drawings, description and claims.

BRIEF DESCRIPTION OF THE DRAWINGS

FIG. 3 is a rear perspective view of an embodiment of the present invention;

FIG. 4 is a section view of an embodiment of the present invention, taken along line 4-4 in FIG. 2;

FIG. 5 is a front view of an embodiment of the present invention, illustrating adjustments to the cutting attachment;

DETAILED DESCRIPTION OF THE INVENTION

Figure 1:
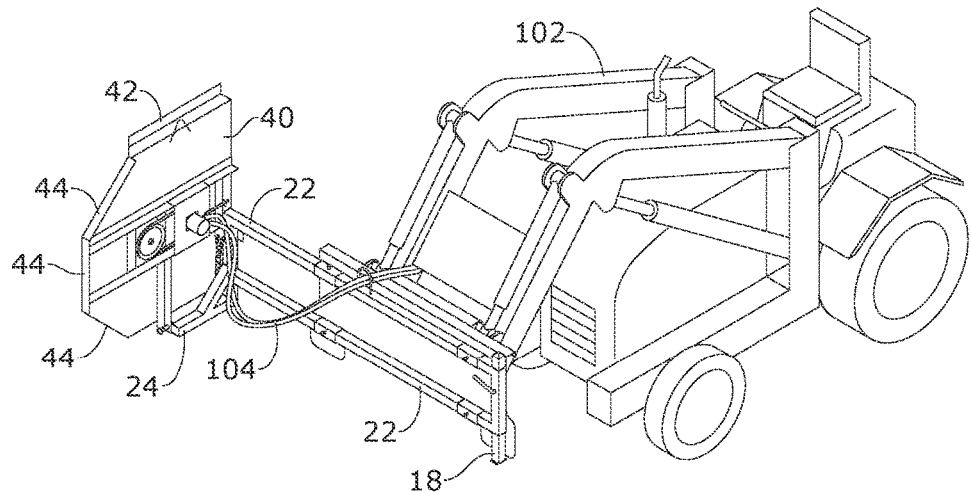
FIG. 1 is a perspective view of an embodiment of the present invention, shown in use.
Figure 2:
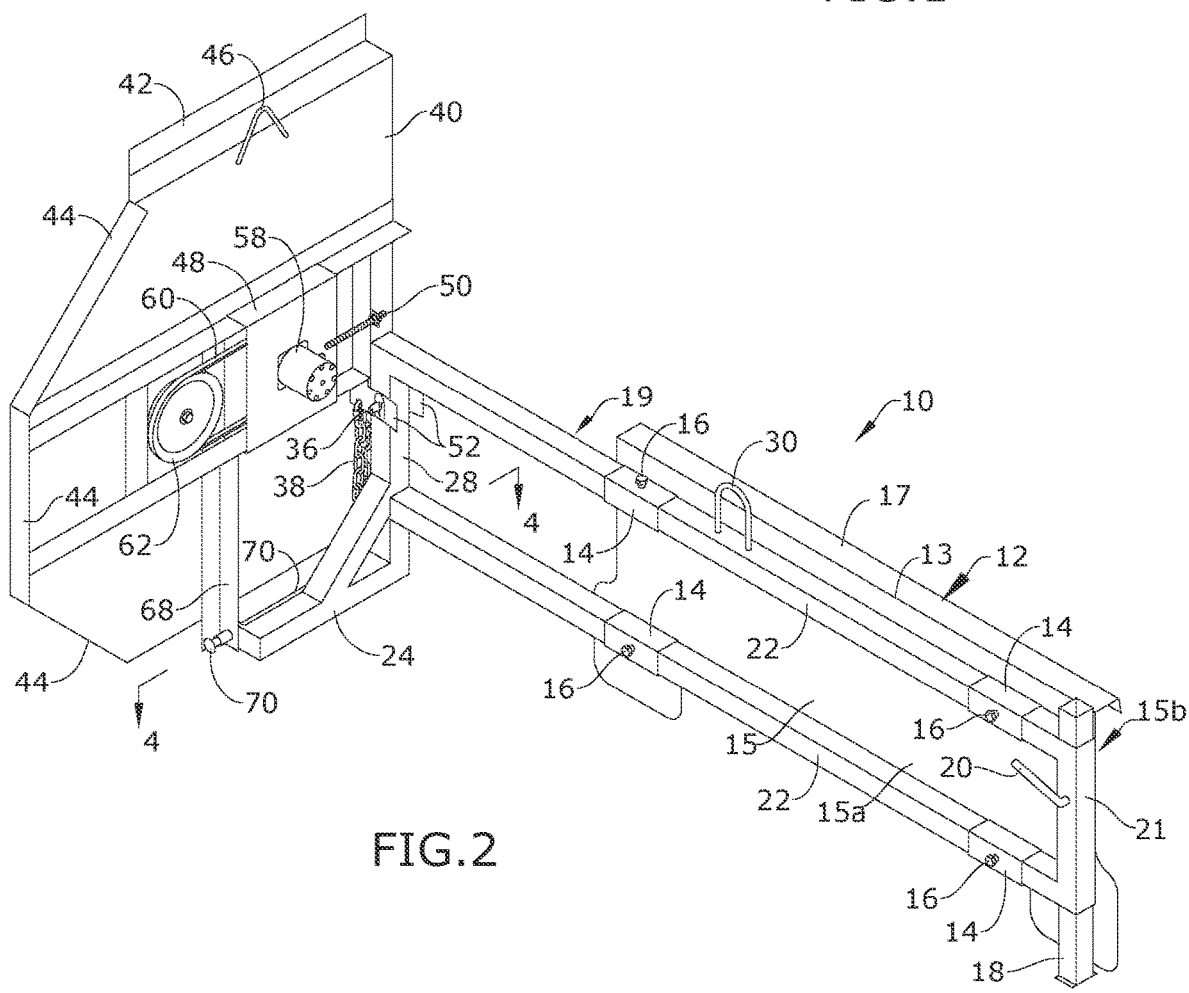
FIG. 2 is a front perspective view of an embodiment of the present invention.
Figure 6:
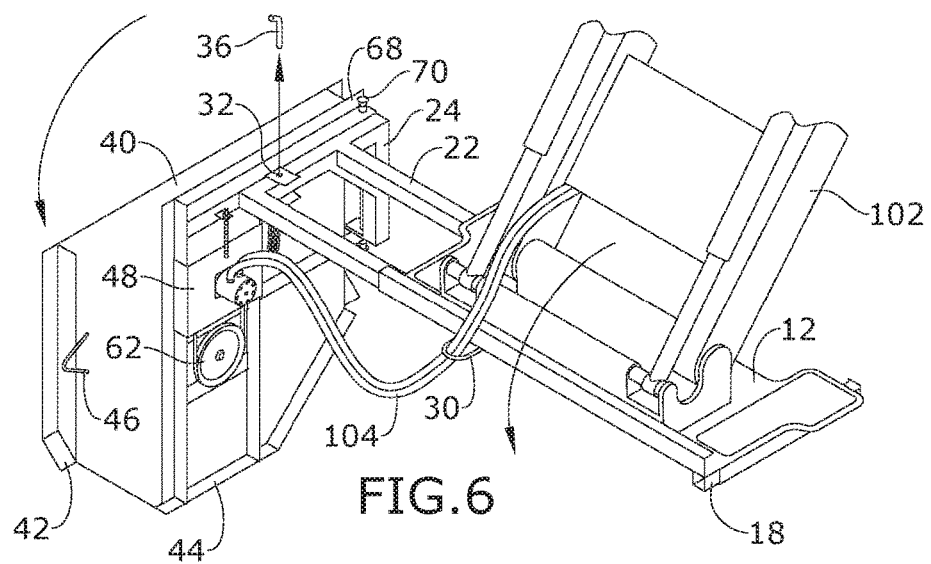
FIG. 6 is a perspective view of an embodiment of the present invention, illustrating adjustments to the cutting attachment.
Figure 7:
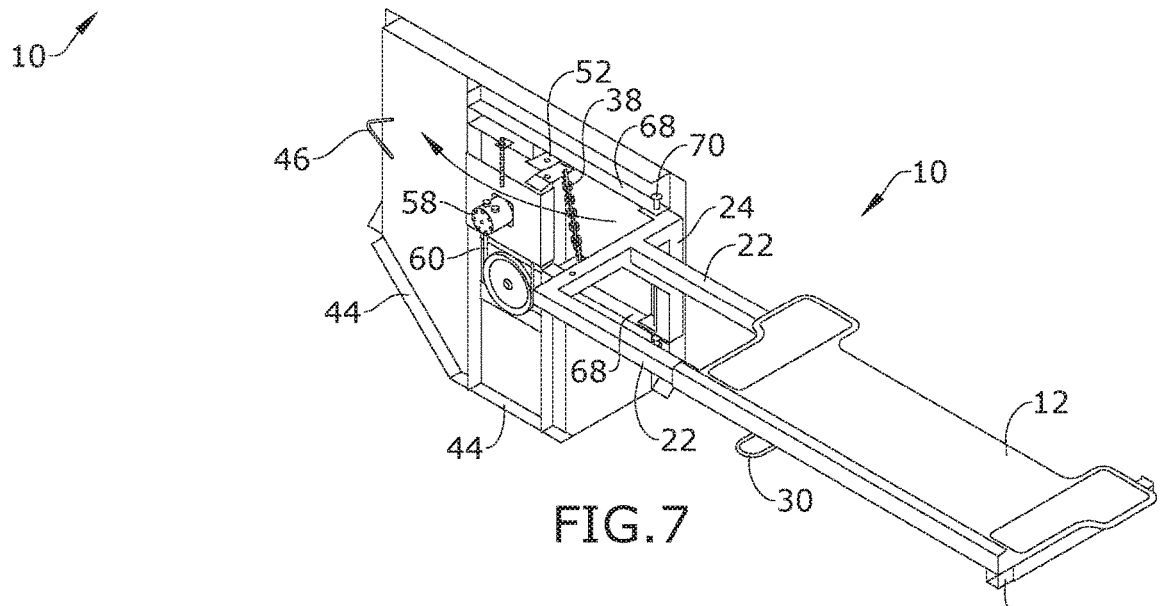
FIG. 7 is a perspective view of an embodiment of the present invention, illustrating adjustments to the cutting attachment.
Figure 8:
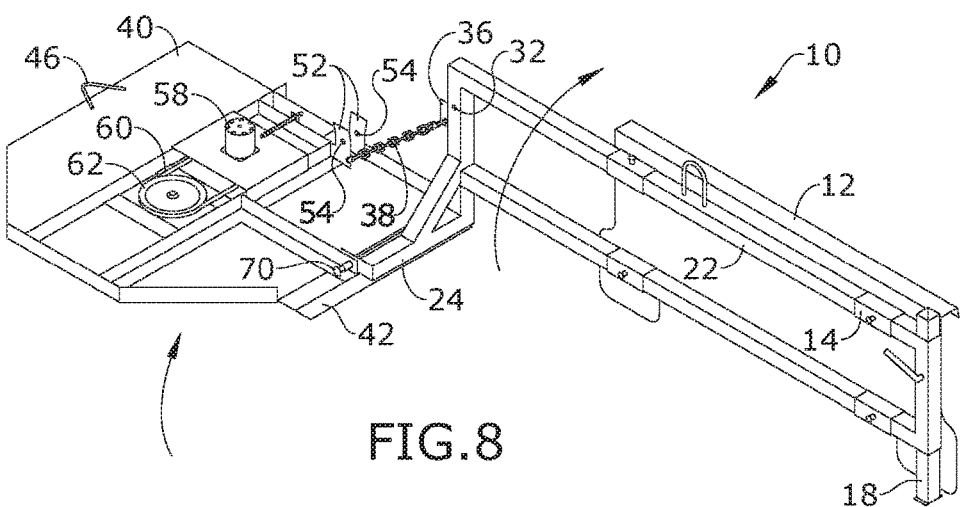
FIG. 8 is a perspective view of an embodiment of the present invention, illustrating adjustments to the cutting attachment.
Figure 9:
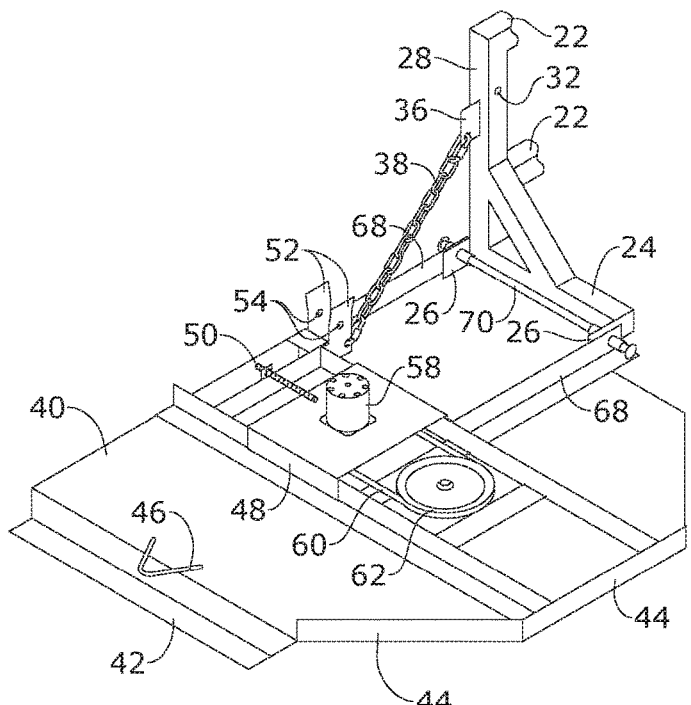
FIG. 9 is a perspective view of an embodiment of the present invention, illustrating adjustments to the cutting attachment.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a mowing-trimming device for cutting and trimming trees and shrubs vertically and horizontally. The present invention attaches to a tractor or excavator via a mounting bracket and hydraulic lines. The present invention allows a person to cut tree branches and brush high above head level as well as on an incline such as around a pond or on a hill by using mounting the attachment to a tractor or excavator and using the tractor or excavator to control the attachment. Multiple limbs can be cut at once with little physical effort.

Referring to FIGS. 1 through 9, the present invention includes a cutting attachment 10. The cutting attachment 10 includes a mounting bracket 12 and a cutting deck 40. The mounting bracket 12 includes a plate 15 having a front surface 15a, a rear surface 15b, and a hooking portion 17 formed by a bend 13 in the plate 15 in a direction towards the rear surface 15b. The hooking portion 17 is configured to couple to at least one hydraulic arm extending from a front end of a tractor or excavator 102. The cutting deck 40 is coupled to the mounting bracket 12. The cutting deck 40 includes an inner surface, an outer surface, a motor 58 coupled to the inner surface, a blade carrier 64 coupled to the outer surface and rotatable by the motor 58, and at least one blade 66 coupled to the blade carrier 64.

In certain embodiments, the mounting bracket 12 includes horizontally disposed slide mounts 14 coupled to the front surface 15a of the plate 15. Set bolts 16 are threadably fastened to the slide mounts 14. The present invention may further include an adjustment frame 19. The adjustment frame 19 includes frame arms 22 slidably disposed within the slide mounts 14. The frame arms 22 may be unlocked from the slide mounts 14 and laterally slidable within the slide mounts 14 by loosening the set bolts 16. The frame arms 22 may be locked to the slide mounts 14 by tightening the set bolts 16. In certain embodiments, a vertical slide 21 may be disposed at a proximal end of frame arms 22. An adjustable foot 18 is slidably disposed within vertical slide 21. A foot adjustment lever 20 locks and unlocks the adjustable foot 18 to the vertical slide 21.

The adjustment frame 19 may further include a frame upright 28 coupled to a distal end of the frame arms 22. The frame upright 28 may further include an opening 32 and a chain plate 36. The adjustment frame 19 may further include a frame leg 24 coupled to the frame upright 28. The frame leg 24 may include frame pivot plates 26.

In certain embodiments, the mounting deck 20 may include deck pivot plates 68 coupled to the inner surface of cutting deck 40. The deck pivot plates 68 are pivotally coupled to frame pivot plates 26 by a pivot rod 70. Securing tabs 52 protrude from the inner surface of cutting deck 40 and includes opening 54. The frame upright 28 fits in between the securing tabs 52. The openings 54 of the securing tabs 52 align with openings 32 of the frame upright 28 and lock pin 34 fits within aligned openings 32, 54, locking the mounting deck 20 in a vertical position. A chain 38 couples the chain plate 36 to the securing tabs 52. When the lock pin 34 is removed from the aligned openings 32, 54, the mounting deck 20 pivots away from the adjustment frame 19 to a horizontal position, and the chain 38 prevents the mounting deck 20 from pivoting beyond the horizontal position. A handle 46 coupled to the cutting deck 40 allows a user to pivot the cutting deck 40 back upwards to the vertical position.

As mentioned above, the motor 58 is used to drive the blades 66. The motor 58 is coupled to inner surface of the cutting deck 40 by motor mount plate 48. A mount plate rod 50 is coupled to the motor mount plate 48. The hydraulic hoses 104 from the tractor or excavator 102 may run through a hose guide 30 and couple to the motor 58. A belt pulley 62 is also coupled to the inner surface and rotated by the motor 58 by a belt 60. The blade carrier 64 is coupled to the outer surface and rotated by belt pulley 60.

The mounting deck 20 further includes front angle irons 44 that guide tree limbs and brush to the blades 66. Skids 42 are coupled to perimeter of the cutting deck 50 on the outer surface and protect the blades 66 and the blade carrier 64.

Figure 10:
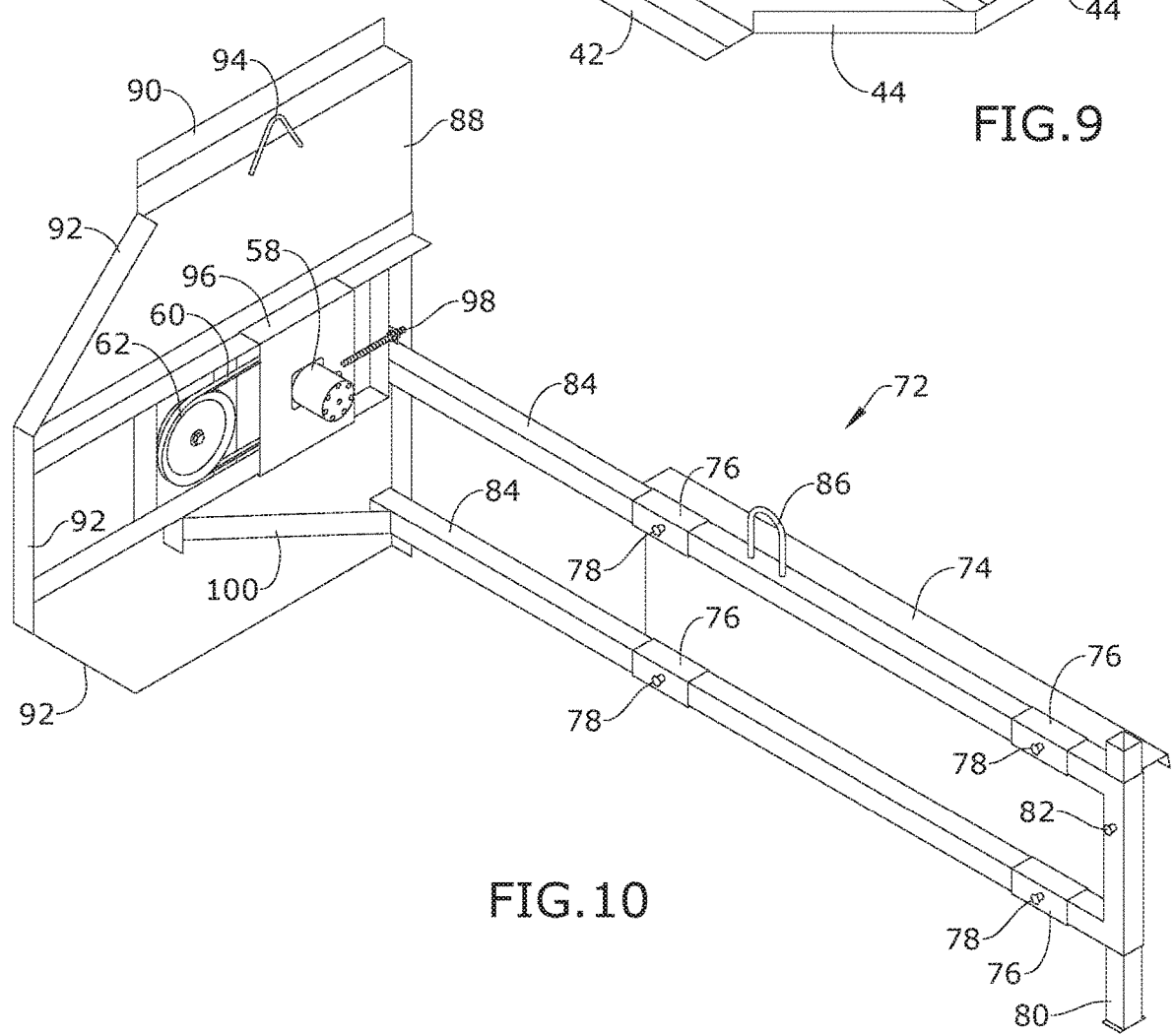
FIG. 10 is a perspective view of an embodiment of the present invention.

As illustrated in FIG. 10, a cutting deck 88 of the present invention may be fixed to frame arms 84 and may not be able to pivot. In such embodiments, the present invention includes a mounting bracket 74, slide mounts 76, set bolts 78, an adjustable foot 80, a foot adjustment set bolt 82, the frame arms 84, a hose guide 86, the cutting deck 88, skids 90, front angle irons 92, a handle 94, a motor mount plate 96, the motor 58, the belt pulley 62, the belt 60, a mount plate rod 98, and an angle support plate 100. The angle support plate 100 fixes the cutting deck 88 to the frame arms 84.

It should be understood, of course, that the foregoing relates to exemplary embodiments of the invention and that modifications may be made without departing from the spirit and scope of the invention as set forth in the following claims.

What is claimed is:

1. A cutting attachment comprising:
   a mounting bracket comprising a plate having a front surface and a rear surface, and a hooking portion formed by a bend in the plate in a direction towards the rear surface, wherein the hooking portion is configured to couple to at least one hydraulic arm extending from a front end of an excavator;
   an adjustment frame having a proximal end and a distal end, comprising two parallel frame arms concurrently slidably coupled to the front surface of the plate by slide mounts, wherein the distal end of said adjustment frame comprises a frame upright perpendicular to said parallel frame arms; and
   a cutting deck coupled to the adjustment frame, wherein the cutting deck comprises an inner surface, an outer surface, a motor, a blade carrier coupled to the outer surface and rotatable by the motor, and at least one blade coupled to the blade carrier; and wherein the cutting deck is laterally slidable with the parallel frame arms relative to the plate.

2. The cutting attachment of claim 1, further comprising set bolts threadably fastened to the slide mounts, wherein the adjustment frame is configured to slide laterally relative to the mounting bracket when the set bolts are in a loosened position, and the adjustment frame is fixed to the mounting bracket when the set bolts are in a tightened position.

3. The cutting attachment of claim 1, wherein the proximal end of the adjustment frame comprises a vertical slide, wherein an adjustable foot is slidably coupled within the vertical slide and fixed within the vertical slide by a lock.

4. The cutting attachment of claim 1, wherein a frame leg extends perpendicularly from the frame upright, wherein the cutting deck is pivotably coupled to the frame leg by a pivot rod.

5. The cutting attachment of claim 4, wherein the cutting deck is releasably coupled in a vertical position to the adjustment frame by securing tabs comprising first openings, a second opening aligning with the first openings, and a lock pin disposed within the aligned openings.

6. The cutting attachment of claim 5, wherein the cutting deck pivots to a horizontal position when the lock pin is removed from the aligning openings.

7. The cutting attachment of claim 6, further comprising a chain comprising a first end coupled to the cutting deck and a second end coupled to the adjustment frame, wherein the chain prevents the cutting deck from pivoting beyond the horizontal position.

8. The cutting attachment of claim 1, wherein the cutting deck further comprises skids and front angle irons coupled to perimeter of the outer surface.

9. The cutting attachment of claim 1, wherein the motor is configured to couple to hydraulic hoses of the excavator.

10. The cutting attachment of claim 1, wherein the blade carrier is coupled to a belt pulley which is rotatably coupled to the motor by a belt.

* * * * *